US007418856B2

(12) United States Patent
Kohler

(10) Patent No.: US 7,418,856 B2
(45) Date of Patent: Sep. 2, 2008

(54) METHOD FOR CHECKING THE GASTIGHTNESS OF A MOTOR VEHICLE TANK VENTILATION SYSTEM

(75) Inventor: Armin Kohler, Ingolstadt (DE)

(73) Assignee: Audi AG, Ingolstadt (DE)

( * ) Notice: Subject to any disclaimer, the term of this patent is extended or adjusted under 35 U.S.C. 154(b) by 14 days.

(21) Appl. No.: 11/513,191

(22) Filed: Aug. 31, 2006

(65) Prior Publication Data

US 2007/0044550 A1 Mar. 1, 2007

(30) Foreign Application Priority Data

Aug. 31, 2005 (DE) ....................... 10 2005 041 341

(51) Int. Cl.
*G01M 15/00* (2006.01)

(52) U.S. Cl. ..................................... 73/49.7; 73/114.39

(58) Field of Classification Search ..................... 73/40, 73/46, 47, 49.7, 112, 115, 116, 117.2, 117.3, 73/118.1, 114.38, 114.39, 114.52, 114.53
See application file for complete search history.

(56) References Cited

U.S. PATENT DOCUMENTS

| | | | | |
|---|---|---|---|---|
| 6,164,123 | A | 12/2000 | Corkill | |
| 6,334,355 | B1 * | 1/2002 | Grieve et al. | 73/49.7 |
| 6,722,187 | B2 * | 4/2004 | Grieve et al. | 73/49.7 |
| 6,807,847 | B2 * | 10/2004 | Steckler et al. | 73/49.7 |
| 6,840,089 | B2 * | 1/2005 | Docy et al. | 73/49.7 |
| 2002/0100314 | A1 * | 8/2002 | Docy et al. | 73/49.2 |
| 2005/0055144 | A1 * | 3/2005 | Steckler et al. | 701/31 |

FOREIGN PATENT DOCUMENTS

| | | | |
|---|---|---|---|
| DE | 43 42 431 | A1 | 6/1995 |
| DE | 197 13 085 | A1 | 10/1998 |
| DE | 198 30 234 | C2 | 1/2000 |
| DE | 101 43 329 | A1 | 4/2003 |

* cited by examiner

*Primary Examiner*—Eric S McCall
(74) *Attorney, Agent, or Firm*—Novak Druce + Quigg LLP

(57) ABSTRACT

The invention relates to a method for checking the gastightness of a motor vehicle tank ventilation system consisting essentially of a fuel tank, an adsorption filter, a ventilation line with a pressure sensor, a fresh air line with an adsorption filter check valve (AAV), and a regeneration line with a tank ventilation valve (TEV) to the internal combustion engine. To compensate for the outgassing of fuel, the total diagnosis time $t_D$ is formed from the negative pressure buildup time $t_1$ and the negative pressure decay time $t_2$ as a measure of the tightness of the tank ventilation system and is compared to a corresponding diagnosis time threshold $t_{DS}$.

9 Claims, 2 Drawing Sheets

METHOD FOR CHECKING THE GASTIGHTNESS OF A MOTOR VEHICLE TANK VENTILATION SYSTEM

This application claims priority from DE 10 2005 041 341.2, filed Aug. 31, 2005.

The invention relates to a method for checking the gastightness of a motor vehicle tank ventilation system.

BACKGROUND OF THE INVENTION

A tank ventilation system consists of a fuel tank, an adsorption filter, and a ventilation line connecting the fuel tank to the adsorption filter. Furthermore, the adsorption filter is connected to the atmosphere by way of a fresh air line in which a controllable check valve is located as the adsorption filter check valve (AAV). Moreover the adsorption filter is connected to the intake manifold of the internal combustion engine by a regeneration line in which there is a controllable regeneration valve as the tank ventilation valve (TEV).

In operation of the internal combustion engine with the check valve (AAV) opened and the tank ventilation valve (TEV) opened, the fuel vapors outgassing from the fuel are intaken by the negative pressure prevailing in the intake manifold. Furthermore, the fuel vapors stored temporarily in the adsorption filter are also disposed of and thus the adsorption filter is regenerated. With the vehicle stopped the tank system is ventilated by way of the adsorption filter, the outgassing fuel vapors being temporarily stored therein.

For reasons of environmental protection, measurement methods are being increasingly required by means of which leaks in tank ventilation systems of motor vehicles are detected and displayed.

Such a generic method is known from DE 40 03 751 A1. In this connection the adsorption filter check valve (AAV) is closed and the tank ventilation valve (TEV) is opened, the system is evacuated and after closing the TEV by means of a pressure sensor it is checked whether the negative pressure decay gradient in the tank ventilation system corresponds to a boundary negative pressure gradient. This method has the disadvantage that the negative pressure generated by way of the intake manifold negative pressure in the tank ventilation system is not constant, but depends on variable parameters. This method is not accurate enough for detecting smaller leaks. In particular a small leak cannot be easily detected by such a simple pressure test, since the fuel based on its vapor pressure behavior builds up a natural pressure depending on the temperature and outside pressure and other effects such as the fill level, fuel quality, or mechanical movements of the fuel tank can mask the effect of a small leak.

Developments of the aforementioned method to be able to detect in particular also smaller leaks are known, in particular a correction being carried out for the outgassing of fuel. For example, in DE 42 27 698 C2 control is exercised to a specified negative pressure with a stable air-fuel mixture, and proceeding from there the pressure variation in the blocked tank ventilation system is detected and evaluated for a tightness diagnosis. In another known method as claimed in DE 197 13 085 A1, the influence parameters are detected and complex correction computations are carried out based on a physical model for the measured pressure variation. In another known method as claimed in DE 44 27 688 C2 the dynamic behavior of the pressure variation is detected using several successive pressure values and an average value formed therefrom is evaluated. in DE 101 43 329 A1 correction values are determined by evaluating the pressure changes in several measurement cycles.

The object of the invention is to develop a generic method for checking gastightness of a motor vehicle tank ventilation system such that with a simple structure of the tank ventilation system and simple process guidance the gastightness of a tank ventilation system can be reliably assessed.

SUMMARY OF THE INVENTION

A method with the following process steps is proposed:

during operation of the internal combustion engine (9) the pressure in the tank ventilation system (1) is set to the ambient pressure level ($P_0$) by controlled closing of the tank ventilation valve (TEV) with the adsorption filter check valve (AAV) opened, at a stable operating point of the internal combustion engine the adsorption filter check valve (AAV) is closed and the tank ventilation valve (TEV) is opened, by which a negative pressure builds up, the negative pressure buildup is determined up to a specified negative pressure buildup threshold ($P_{S2}$) which is detected by at least one pressure sensor (6), the assigned negative pressure buildup time ($t_1$) is measured, when the negative pressure buildup threshold ($P_{S2}$) is reached the tank ventilation valve (TEV) is closed, by which the negative pressure decays again, the negative decay is determined up to a specified negative pressure decay threshold ($P_{S1}$) which is detected by at least one pressure sensor (6) and the assigned negative pressure decay time ($t_2$) is measured, the negative pressure buildup time ($t_1$) and the negative pressure decay time ($t_2$) are added to form the total diagnosis time ($t_D$) and compared to a diagnosis time threshold ($t_{DS}$), when the diagnosis time threshold ($t_{DS}$) is not reached a fault signal being produced.

In order to ensure that incorrect fault detection does not occur when the tank ventilation system is in fact tight, in the negative pressure systems according to the prior art the initially explained complex corrections which take into account the outgassing of fuel are necessary. These complex corrections are not necessary with this method as claimed in the invention since adding the negative pressure buildup time $t_1$ and the negative pressure decay time $t_2$ yields compensation of the outgassing of fuel. This sum as the total diagnosis time $t_D$ is a measure of the tightness of the tank ventilation system and is compared to a corresponding diagnosis time threshold $t_{DS}$. When the corresponding diagnosis time threshold $t_{DS}$ is not reached, a leak is detected and a fault signal for further processing is produced.

For this purpose, the tank ventilation valve (TEV) is preferably made as a control valve which can be controlled with respect to its flow passage and which during the negative pressure buildup time $t_1$ is slowly actuated up to a specified opening cross section.

Such a slow actuation time of the tank ventilation valve (TEV) up to a specified opening cross section (duty factor) can be preferably on the order of about 10 seconds. If a long total diagnosis time composed of the negative pressure buildup time $t_1$ and the negative pressure decay time $t_2$ is detected, for example about 50 seconds, the tank ventilation system is recognized as tight, or for a short total diagnosis time $t_D$ of for example 10 seconds, it is recognized as leaky. Monitoring with the method as claimed in the invention can be carried out in the temperature range from −7° C. to 40° C. which range can be legally prescribed.

The outgassing of fuel is also considered in the method as claimed in the invention, but without this having to be determined separately for a closed system and used for correction purposes. By observing the system behavior when the tank ventilation valve (TEV) is being actuated to produce the required negative test pressure as a negative pressure buildup threshold $P_{S2}$ and the system behavior after closing of the tank ventilation valve (TEV), the outgassing of fuel is automatically compensated such that small outgassing causes a short negative pressure buildup time $P_1$ and an assigned long negative pressure decay time $t_2$ and that strong outgassing yields a long negative pressure buildup time $t_1$ and an assigned short negative pressure decay time $t_2$, as a measure for the tightness of the tank the total diagnosis time $t_D$ is decisive compared to a diagnosis time threshold $t_{DS}$.

The adsorption filter check valve (AAV) is closed quickly upon reversal and can therefore be made as a simple, switchable solenoid valve (2-point valve).

The at least one pressure sensor necessary for diagnosis is preferably located in the ventilation line between the fuel tank and the adsorption filter. Depending on circumstances however another configuration within the pressure system can also be undertaken.

For the two required pressure threshold values one assigned pressure switch each can be used. Alternatively a continuously operating pressure sensor is possible with which operating signals for the respectively assigned valves are produced at the two pressure threshold values via a downstream evaluation unit. In a structurally simple and economical embodiment, a pressure switch with hysteresis on the basis of the negative pressure buildup threshold $P_{S2}$ and the negative pressure decay threshold $P_{S1}$ is proposed.

The adsorption filter is a known activated charcoal filter. Furthermore there is a conventionally mounted air filter on the free end of the fresh air line as claimed in claim 7.

To additionally refine the method, instead of a fixed, specified diagnosis time threshold the latter can be established as a variable value depending on the detected boundary conditions, but as before the above described automatic compensation taking place with respect to the escaping fuel vapors.

BRIEF DESCRIPTION OF THE DRAWINGS

The invention will now be detailed using the drawings.

DETAILED DESCRIPTION OF THE PREFERRED EMBODIMENTS OF THE INVENTION

Figure 1:
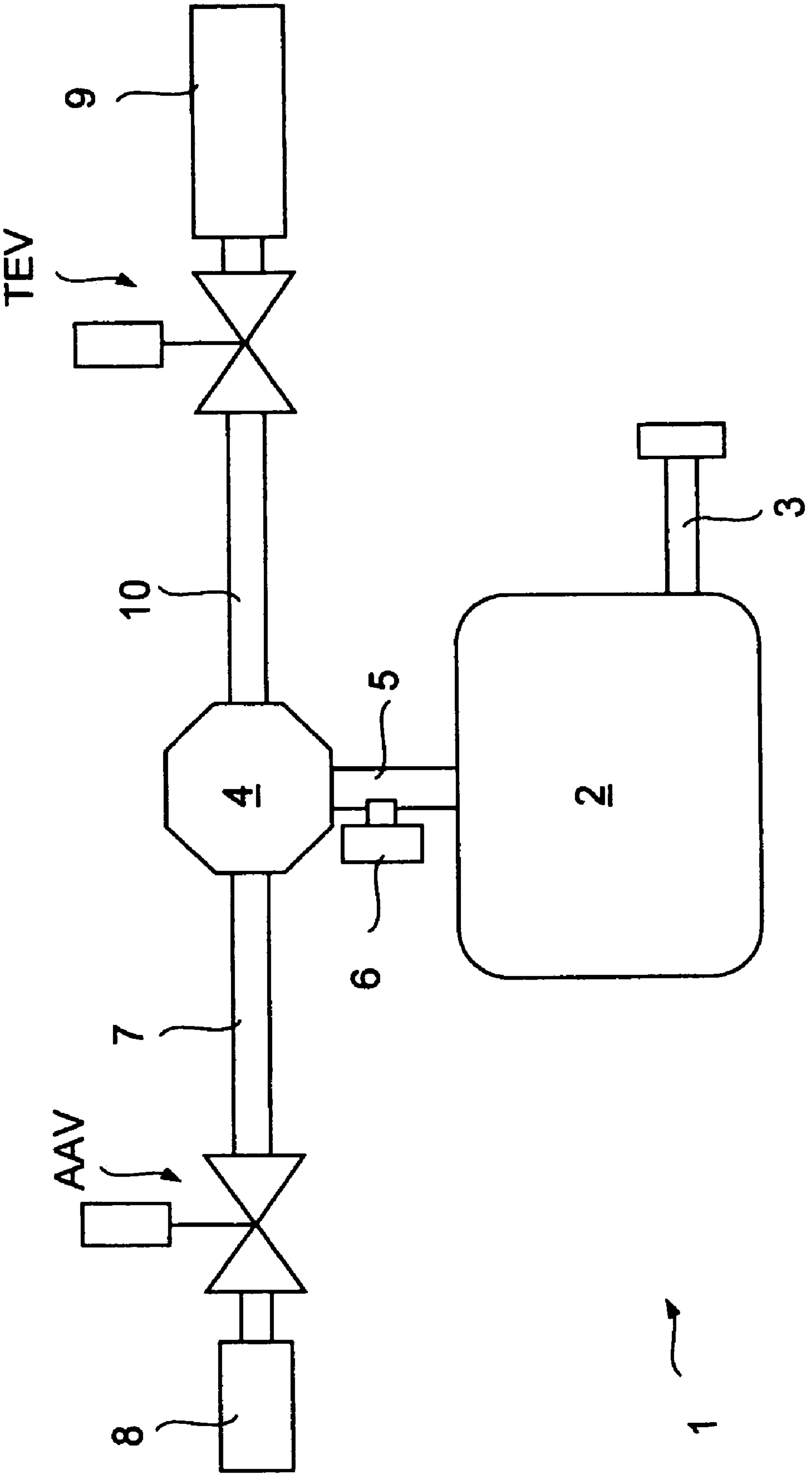
FIG. 1 shows a schematic of a tank ventilation system.

FIG. 1 schematically shows a tank ventilation system 1 consisting of a fuel tank 2 with a fill neck 3 and an adsorption filter 4 as an activated charcoal filter.

The adsorption filter 4 is connected to the fuel tank 2 by a ventilation line 5 on which there is a pressure switch 6 with hysteresis for two pressure thresholds.

Furthermore the adsorption filter 4 is connected by way of a fresh air line 7 and an end-side air filter 8 to the atmosphere, in the fresh air line 7 there being a controllable check valve as the adsorption filter check valve (AAV) in the form of a switchable two-point solenoid valve.

Moreover the adsorption filter 4 is connected to the intake manifold of an internal combustion engine 9 by a regeneration line 10 in which a controllable regeneration valve as the tank ventilation valve (TEV) is located. The tank ventilation valve (TEV) is made as a controllable control valve with a variable opening cross section. The pressure switch 6 and the controllable valves (AAV) and (TEV) are connected to a control/evaluation unit (not shown), the process steps shown in the diagram according to FIG. 2 being carried out in a controlled manner:

During operation of the internal combustion engine 9 by controlled closing of the tank ventilation valve (TEV) with the adsorption filter check valve (AAV) opened, the pressure in the tank ventilation system 1 is set to the ambient pressure level $P_0$.

Figure 2:
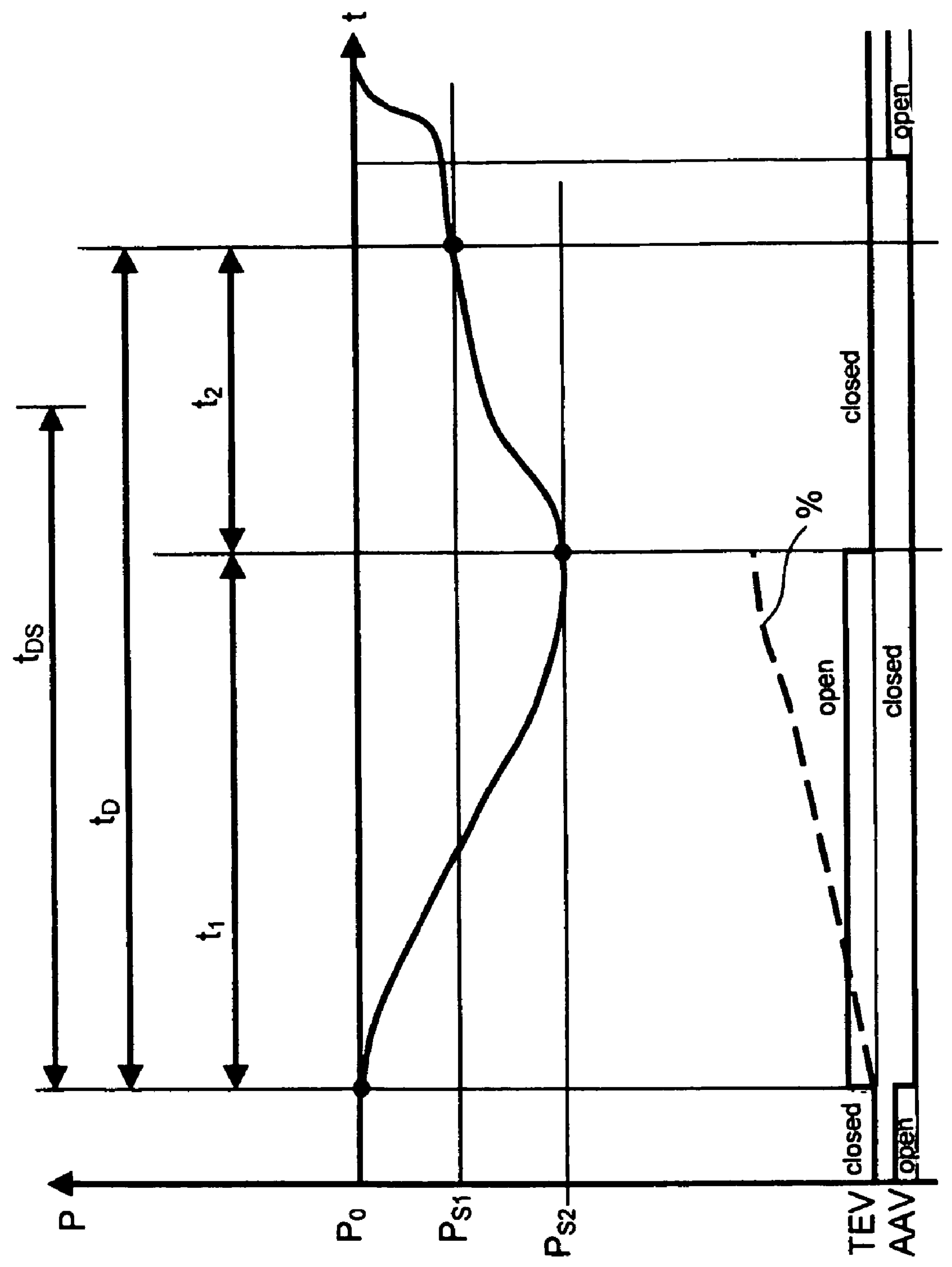
FIG. 2 shows a diagram depicting pressure as a function of time.

At a stable operating point of the internal combustion engine, for example when idling, the adsorption filter check valve (AAV) is closed and the tank ventilation valve (TEV) is opened. The opening of the tank ventilation valve (TEV) takes place gradually and slowly up to a specified opening cross section according to the duty factor in percentage, as is shown by the broken line in the lower region of the diagram as shown in FIG. 2 in conjunction with the opening diagram for the TEV. Due to slow opening of the tank ventilation valve (TEV) with the adsorption filter check valve (AAV) closed, a negative pressure builds up in the tank ventilation system 1 due to the negative pressure in the intake manifold of the internal combustion engine 9. The negative pressure builds up until a specified negative pressure buildup threshold $P_{S2}$ is detected by the pressure switch 6. The time from the start of opening of the tank ventilation valve (TEV) until the negative pressure buildup threshold $P_{S2}$ is reached is measured as the assigned negative pressure build-up time $t_1$ and stored for further use.

When the negative pressure buildup threshold $P_{S1}$ is reached, the tank ventilation valve (TEV) is quickly closed. The adsorption filter check valve (AAV) also remains closed, so that the system of the fuel tank 2, the adsorption filter 4, the fresh air line 7, the regeneration line 10, and the ventilation line 5 is closed.

In this closed system, negative pressure decay now takes place which proceeds more or less quickly depending on the size of the leak. This negative pressure decay is detected with the pressure switch 6 up to a negative pressure decay threshold $P_{S1}$. The time for negative pressure decay is measured as the negative pressure decay time $t_2$.

The negative pressure buildup time $t_1$ and the negative pressure decay time $t_2$ are added in the evaluation unit to form the total diagnosis time $t_D$ and are compared to a diagnosis time threshold $t_{DS}$. When the total diagnosis time $t_D$ is long and the diagnosis time threshold $t_{DS}$ is exceeded, the tank ventilation system 1 is recognized as tight. For a short total diagnosis time $t_D$ and when the corresponding diagnosis time threshold $t_{DS}$ is not reached, conversely the tank ventilation system is recognized as leaky, a fault signal being produced for further processing.

The invention claimed is:

1. Method for checking the gastightness of a motor vehicle tank ventilation system, the system comprising:

a fuel tank, an adsorption filter, ventilation line connecting the fuel tank to the adsorption filter, a fresh air line which connects the adsorption filter to the atmosphere and in which a controllable check valve is located as the adsorption filter check valve (AAV), a regeneration line which connects the adsorption filter to the intake manifold of the internal combustion engine and in which there is a controllable regeneration valve as the tank ventilation valve (TEV), at least one pressure sensor in the tank ventilation system, and a control/evaluation unit, to check the tank ventilation system with the adsorption filter check valve (AAV) closed by controlled opening of the tank ventilation valve (TEV), a negative pressure being produced in the tank ventilation system with a pressure variation which is evaluated after controlled closing of the tank ventilation valve (TEV) for tank leak diagnosis, the method comprising:

during operation of the internal combustion engine the pressure in the tank ventilation system is set to the ambient pressure level ($P_0$) by controlled closing of the tank ventilation valve (TEV) with the adsorption filter check valve (AAV) opened, at a stable operating point of the internal combustion engine the adsorption filter check valve (AAV) is closed and the tank ventilation valve (TEV) is opened, by which a negative pressure builds up, the negative pressure buildup is determined up to a specified negative pressure buildup threshold ($P_{S2}$) which is detected by at least one pressure sensor, the assigned negative pressure buildup time ($t_1$) is measured, when the negative pressure buildup threshold ($P_{S2}$) is reached the tank ventilation valve (TEV) is closed, by which the negative pressure decays again, the negative pressure decay is determined up to a specified negative pressure decay threshold ($P_{S1}$) which detected by at least one pressure sensor and the assigned negative pressure decay time ($t_2$) is measured, the negative pressure buildup time ($t_1$) and the negative pressure decay time ($t_2$) are added to form the total diagnosis time ($t_1$) and are compared to a diagnosis time threshold ($t_{DS}$), when the diagnosis time threshold ($t_{DS}$) is not reached a fault signal being produced.

2. The method as claimed in claim 1, wherein the tank ventilation valve (TEV) is a control valve which can be controlled with respect to its flow passage and which during the negative pressure buildup time ($t_1$) is slowly actuated up to a specified opening cross section (%).

3. The method as claimed in claim 1, wherein the adsorption filter check valve (AAV) is a switchable solenoid valve.

4. The method as claimed in claim 1, wherein at least one pressure sensor is located in the ventilation line between the fuel tank and the adsorption filter.

5. The method as claimed in claim 1, wherein the pressure sensor is a pressure switch with hysteresis on the basis of the negative pressure buildup threshold ($P_{S2}$) and the negative pressure decay threshold ($P_{S1}$).

6. The method as claimed in claim 1, wherein the adsorption filter is an activated charcoal filter.

7. The method as claimed in claim 1, wherein there is an air filter on the free end of the fresh air line.

8. The method as claimed in claim 1, wherein the diagnosis time threshold ($t_{DS}$) is established as a variable value depending on the detected boundary conditions.

9. A method of measuring leakage in tank ventilation system for an internal combustion engine comprising, in order:

closing a tank ventilation valve (TEV) in fluid communication with a fuel tank;

opening an adsorption filter check valve (AAV) in fluid communication with the fuel tank and to ambient pressure to determine an ambient pressure level $P_0$;

closing the AAV and opening the TEV to produce a negative pressure build up in the system;

measuring the time ($t_1$) required for the negative pressure to equal a specified pressure ($P_{S2}$);

closing the TEV;

measuring a negative pressure decay time ($t_2$) until a negative decay threshold ($P_{S1}$) is reached;

adding the $t_1$ time to the $t_2$ time; and comparing the sum of the $t_1$ and $t_2$ times to a diagnosis time $t_D$ to determine the pressure of leaks.

* * * * *